(No Model.)
M. P. SCOTT.
COTTON PLANTER.
No. 537,619. Patented Apr. 16, 1895.
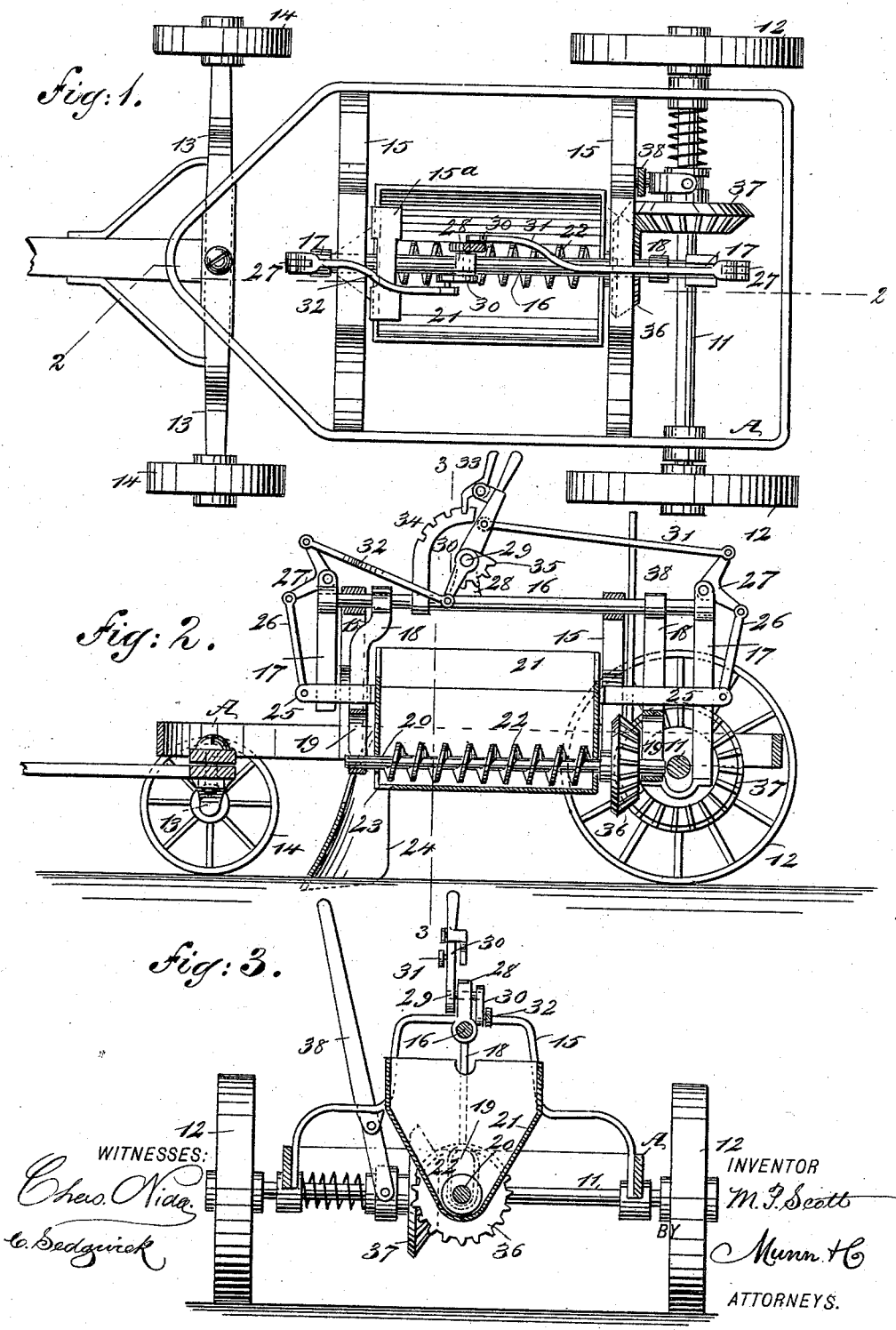
WITNESSES:
Chas. Nida.
C. Sedgwick
INVENTOR
M. P. Scott
BY
Munn & Co.
ATTORNEYS.

UNITED STATES PATENT OFFICE.

MORSE P. SCOTT, OF WOODVILLE, MISSISSIPPI, ASSIGNOR OF FORTY-NINE ONE-HUNDREDTHS TO THOMAS F. RYDER, OF NEW YORK, N. Y.

COTTON-PLANTER.

SPECIFICATION forming part of Letters Patent No. 537,619, dated April 16, 1895.

Application filed June 14, 1894. Serial No. 514,560. (No model.)

*To all whom it may concern:*

Be it known that I, MORSE P. SCOTT, of Woodville, in the county of Wilkinson and State of Mississippi, have invented a new and Improved Cotton-Planter, of which the following is a full, clear, and exact description.

My invention relates to a planter especially adapted for planting cotton seed, and it has for its object to provide a machine of simple and economic construction, one in which the seed will be delivered to the ground at the rear of the furrow opener and at all times in the furrow made; and a further object of the invention is to provide a means whereby the seed box and furrow opener may be elevated in such manner as to provide for shallow or deep planting, the adjustment of the seed box and furrow opener being accomplished by simple mechanism and in a convenient manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is a vertical longitudinal section taken practically on the line 2—2 of Fig. 1; and Fig. 3 is a transverse vertical section taken essentially on the line 3—3 of Fig. 2.

In carrying out the invention a base frame A, is provided, usually of a skeleton construction, the said frame being supported upon a rear axle 11 provided with suitable sized wheels 12, and the frame is pivotally connected with a forward axle 13, carrying wheels 14, preferably smaller than the rear wheels. Brackets 15, are supported by the base A, extending upwardly therefrom, and the said brackets are utilized to journal a longitudinal rock shaft 16, the ends of the said shaft being securely attached to downwardly extending guide bars 17. Hangers 18, are likewise secured to the rock shaft 16, and extend downwardly therefrom adjacent to the guide bars 17, the hangers being provided at their lower ends with elongated openings 19, adapted to adjustably journal the ends of a shaft 20. The shaft 20, is located in the bottom of the seed box 21, and that portion of the shaft which is in the box is provided with a screw surface 22, whereby the said section of the shaft is virtually a screw conveyer, and when the shaft is turned is adapted to carry the seed to an opening 23 in the bottom of the box preferably at its forward end and at the rear of a furrow opener 24, said opener being secured preferably to the bottom of the box, but it may be attached to the forward hanger 18. The box is supported in position not only by the shaft 20, but likewise by arms 25, projected from its ends, which ends have sliding and guided movement on the guide rods 17 of the rock shaft. These arms at their outer ends are pivotally connected with links 26, and the said links are in their turn pivotally connected with one end of an elbow lever 27, one such lever being fulcrumed upon each outer end of the rock shaft 16. A stud or post 28, is projected upward from the rock shaft, and serves as a bearing for a spindle 29, the said spindle being provided with crank arms 30 at its ends, one of which is in the nature of a hand lever; and the hand lever is pivotally connected with one of the elbow levers 27 by a link 31, a crank arm 30 being connected with the opposite lever 27 by a link 32. Thus by manipulating the hand lever, which is provided with a latch 33 adapted to enter a rack 34, the seed box, its feed shaft and the furrow-opener will be raised and lowered, the box being parallel with the surface over which it is located.

Mutilated gears 35, are shown as carried by the spindle 29. These gears are not brought into action in this form of the machine, but only when the frame of the machine, rock shaft and levers are used in connection with a cotton chopper and cultivator blades, the latter form of the machine being illustrated in the application filed of even date herewith, Serial No. 514,559.

The feed shaft 20 is provided with a pinion 36, which is adapted to mesh with a clutch and spring-controlled gear 37, held to slide upon and turn with the axle 11, said gear being operated, that is, thrown in or out of mesh with the pinion 36, through the medium of a shifting lever 38.

It will be observed that the seed box and the furrow opener are all connected with and carried by the rock shaft 16, and that by rocking the shaft, which may be done through the medium of a foot plate 15ª, the furrow opener and the seed box may be carried together in direction of the right or of the left of the machine, in order that the furrow opener may, for example, avoid an obstruction in its path.

Having thus described my invention, I claim as new and desire to secure by Letters Patent—

1. In a planter, a vertically adjustable seed box, a feed screw held to turn therein, the frame having vertically elongated slots or openings forming bearings for the shaft of the feed screw and a furrow opener located adjacent to an exit opening for the seed, substantially as shown and described.

2. In a planter, the combination, with a rocking support, of a seed box carried by the support, a furrow opener connected with the seed box in advance of and adjacent to the seed exit opening thereof, and a feed device carried by the box and adapted to feed seed to the outlet aperture in the box, substantially as and for the purpose specified.

3. In a planter, the combination, with a rocking support, and a shifting lever carried by the support, of a seed box suspended beneath and having guided connection with the support, the said box being provided with a seed outlet opening, a lifting connection between the ends of the box and the shifting lever, a furrow opener located in front of the seed outlet of the box and having movement with the box, and a feed screw located in the box and adapted to convey seed to the outlet of the box, substantially as and for the purpose specified.

4. In a cotton planter, the combination, with a frame, a rock shaft supported thereby, guides projected from the rock shaft, hangers likewise attached to the rock shaft and provided with elongated bearings, and a shifting lever located upon the rock shaft, of a seed box provided with extensions at its ends having sliding movement on the guides of the rock shaft, a link and lever connection between the extensions of the box and the shifting lever, a feed shaft provided with a screw section located within the seed box, the ends of the feed shaft being journaled in the elongated bearings of the hangers, a furrow opener located adjacent to the seed discharge opening of the seed box, and means, substantially as shown and described, for driving the feed shaft, as and for the purpose set forth.

5. In a planter, the combination with the supporting frame of the seed box movable up and down therein and devices whereby to effect such movement and to positively secure the box in its different positions, and a feeder located and operating within the seed box substantially as set forth.

6. In a planter, the supporting frame combined with the seed box movable up and down therein, links connected with said box at the opposite ends thereof, and elevating devices connected with said links, substantially as set forth.

7. In a planter, the combination of the supporting frame, the seed box movable up and down, links connected with the seed boxes at the opposite ends thereof, levers having one arm connected with said links and operating devices connected with the other arms of said levers, substantially as set forth.

MORSE P. SCOTT.

Witnesses:
J. FRED ACKER,
JNO. M. RITTER.